United States Patent [19]

Engel et al.

[11] Patent Number: 4,758,615

[45] Date of Patent: Jul. 19, 1988

[54] POLYMERS CONTAINING URETHANE GROUPS PREPARED BY THE REACTION OF POLYAMINO COMPOUNDS AND CYCLIC CARBONATES

[75] Inventors: Dieter Engel, Kelsterbach; Christoph Just, Niedernhausen; Gerhard Brindöpke, Frankfurt am Main; Gerd Walz, Wiesbaden, all of Fed. Rep. of Germany

[73] Assignee: Hoechst AG, Fed. Rep. of Germany

[21] Appl. No.: 53,088

[22] Filed: May 22, 1987

[30] Foreign Application Priority Data

May 26, 1986 [DE] Fed. Rep. of Germany ....... 3617705

[51] Int. Cl.$^4$ ................................................ C08G 67/00
[52] U.S. Cl. ..................... 524/198; 524/612; 524/726; 524/879; 524/755; 525/418; 525/519; 525/533; 528/341; 528/370; 549/229; 549/230; 549/553; 560/158
[58] Field of Search ............... 524/198, 612, 726, 879, 524/755; 525/418, 519, 533; 528/341, 370; 549/229, 230, 553; 560/158

[56] References Cited

U.S. PATENT DOCUMENTS 4,105,641  8/1978  Buysch et al. ..................... 528/370

Primary Examiner—Maurice J. Welsh
Attorney, Agent, or Firm—Bierman and Muserlian

[57] ABSTRACT

Polymers which contain urethane groups and are capable of being crosslinked by extraneous crosslinking agents, solutions thereof and aqueous dispersions thereof, prepared without the use of isocyanates by reacting polyamino compounds with polycarbonates and, if appropriate, reacting the reaction product further with polycarboxylic acids to give products having an acid number between 0 and 100, and, if appropriate, neutralizing the resulting products partly or completely by adding basic compounds, preferably organic bases, and, if appropriate, mixing the partly or completely neutralized products vigorously with an amount of water such that aqueous polymer dispersions having a solids content of up to 75% by weight, relative to the dispersion, are obtained.

The use of the polymers containing urethane groups on their own or as a mixture with further reactive components, as extraneous crosslinking agents, from the group comprising isocyanate, melamine, alkyd and epoxy resins, in non-aqueous or aqueous formulations of adhesives and paints, especially in aqueous baking paint formulations and in aqueous, curable paint formulations which can be deposited by anaphoresis.

14 Claims, No Drawings

POLYMERS CONTAINING URETHANE GROUPS PREPARED BY THE REACTION OF POLYAMINO COMPOUNDS AND CYCLIC CARBONATES

The invention relates to polymers containing urethane groups, solutions thereof and aqueous dispersions thereof, a process for their preparation and their use as binder components in non-aqueous or aqueous adhesive and paint systems, in particular in aqueous, curable paint systems.

Incorporation of protective layers which absorb shock or impact is important for numerous applications in paint technology, particularly in the production of multilayer paint coatings on metallic substrates. Thus, for example, painted areas of motor vehicle coachwork are exposed to special influences, such as, for example, impact from stones caused by whirled up gritting material, above all stone chippings. When subjected to impact of this type it is possible, for example, for protective layers against stone impact and/or so-called filler layers located between the conventional primer and the top coat of paint to dissipate a decisive fraction of the energy. In addition, filler layers should make it possible to produce smooth surfaces, for example in mass painting of automobiles, by leveling out the unevenness in the substrate. Additionally, fillers must, on the one hand, produce relatively hard films to make it possible for the paint coating to be ground wet without the abrasive paper clogging in the course of the operation, on the other hand, they should possess an adequate elasticity, even at low temperatures, in order to ensure effective protection against impact by stones.

Examples of binders present in fillers of the state of the art are alkyd (polyester) resins, amine resins and, in some cases, epoxy resins. Binders of this type admittedly produce hard paint films, but not adequately elastic paint films, so that they have only a limited action in protecting against impact by stones.

By virtue of the continuous increase in the stringency of environmental protection regulations, the users of fillers also have an increased interest in aqueous filler systems, so-called hydro-fillers, which are solvent-free or of low solvent content.

The invention is therefore based on the problem of preparing polymeric binders or stable aqueous dispersions thereof which can act as elasticizing binder components, particularly in paint systems, for example in so-called hydro-filler formulations, in which the resulting paint must, after the customary baking process, for example at 100° to 180° C., have an adequate elasticity, i.e. exhibits in particular excellent impact or Erichsen deep-draing values, and which can also be used with advantage in adhesive systems.

It has now been found, surprisingly, that this problem can be solved by employing binders or binder dispersions containing crosslinkable polymers containing urethane groups, it being possible to prepare the crosslinkable polymers containing urethane groups without the use of isocyanates, by reacting biscarbonates with diamines.

The reaction of biscarbonate structures with diamines is known in principle from the literature.

Various processes for the preparation of polymer dispersions containing urethane groups are already known (cf., for example, D. Dieterich, Angew. Makromol. Chem. 98 (1981) 133–165). A factor common to them is the use of diisocyanates. The latter are relatively expensive components which increase the price of the end product considerably. The resulting high price level cannot be tolerated for various fields of use in the paint sector, for example for use in relatively cheap intermediate layer paint coatings, particularly in so-called fillers.

As is known, fillers serve the purpose of building up paint coatings in order to produce coats of paint which appear optically thick and have round edges, particularly on automobiles. On the other hand, they form a certain protection against impact by stones and the effects of stone chippings. However, apart from the carboxyl groups required for dispersion, the polyurethane (PUR) dispersions prepared by the known processes mentioned above generally contain no further functional groupings which could be used, for example, for additional crosslinking reactions, so that the coverings or paint coatings prepared from them are not adequately resistant to solvents or water, which can be a decisive disadvantage.

The use of polyaminourethanes for the preparation of molded articles of improved elasticity by reaction with epoxide resins is disclosed in USSR Patent Publication SU No. 413,824-A. The polyaminourethanes used are prepared by reacting biscarbonates with diamines. Elastic molded articles are obtained as end products by curing the epoxide resin/polyaminourethane mixture in suitable moldings.

Reactive resin mixtures composed of biscarbonate and polyamino components are disclosed in Japanese Patent Publications No. Sho 57 (=1982)—202,317 and No. Sho 57 (=1982)—202,318. The urethane structures resulting when these mixtures are reacted are, however, only formed after the resin composition has been applied to the substrate.

The present invention relates to polymers, containing urethane groups, of the general formula (I) or aqueous dispersions thereof

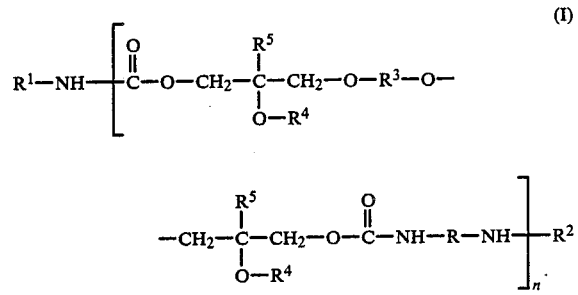

in which R, $R^1$, $R^2$, $R^3$, $R^4$, $R^5$ and n have the following meaning:

n is a number from 1 to 500, preferably 2 to 100 and especially 5 to 50, $R^5$ is H and/or $CH_3$, R is alkylene which has 1-25, preferably 3-15 and especially 5-10, carbon atoms and which can be linear, branched, cyclic, saturated or unsaturated and can also contain heteroatoms, preferably oxygen and/or nitrogen, and also hydroxyl, amino or carboxyl groups, or is a divalent group of the formulae (II), (III) or (IV),

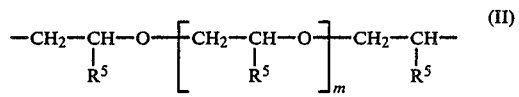

(II)

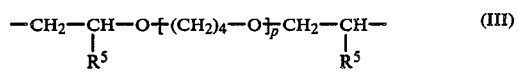

(III)

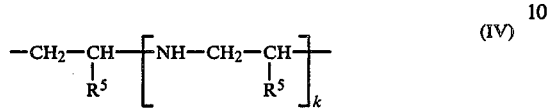

(IV)

in which m and p are a number from 0 to 1,000, preferably 1 to 50 and especially 3 to 30 and k is a number from 0 to 20, preferably 1 to 5, or mixtures of the groups of the formulae (II), (III) and (IV), $R^1$ is $H_2N—R—$ or alkyl which has 1–25, preferably 3–15 and especially 5–10, carbon atoms and which can be linear, branched, cyclic, saturated or unsaturated and can also contain heteroatoms, preferably oxygen and/or nitrogen, and also hydroxyl, amino or carboxyl groups, or aryl having 6–14, preferably 6–10, carbon atoms, in particular phenyl or naphthyl, which can, in addition, be substituted by $(C_1-C_8)$-alkyl groups, $(C_1-C_8)$-hydroxyalkyl groups or hydroxyl, amino or carboxyl groups and can also contain heteroatoms, preferably oxygen and/or nitrogen, or alkylaryl which has 7–25 carbon atoms and which can, in addition, be substituted by hydroxyl, amino or carboxyl groups and can also contain heteroatoms, preferably oxygen and/or nitrogen, $R^2$ is H or $R^1$, or a group of the formula (V)

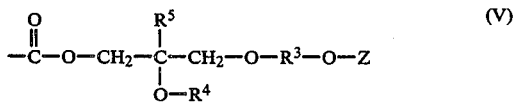

in which Z can denote one of the groupings

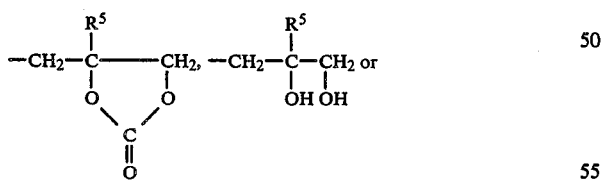

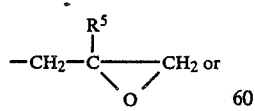

$R^2$ and $R^1$ together represent a cyclization member, when the compound of the formula (I) is cyclized, $R^3$ is (a) alkylene which has 1–25, preferably up to 15 and especially up to 6, carbon atoms and which can be linear, branched, cyclic, saturated or unsaturated, or a divalent group of the formula (VI)

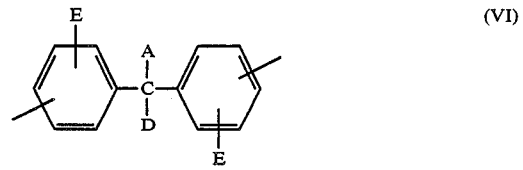

in which A and D denote H or $(C_1-C_3)$-alkyl, preferably H or methyl, and E denotes H or $(C_1-C_8)$-alkyl or halogen, in particular chlorine or bromine, and the benzene rings in formula (VI) can also be partly or completely hydrogenated, or a divalent bisphenylene radical which is optionally substituted by lower alkyl groups and/or halogen and in which the benzene rings can also be partly or completely hydrogenated, or a divalent group of the formula (VII)

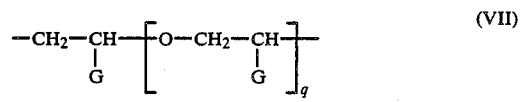

in which q denotes a number from 1 to 200, preferably 2 to 50 and especially 2 to 25 and G denotes H and/or $(C_1-C_3)$-alkyl, preferably H and/or methyl, or a divalent polytetrahydrofuran group of the formula (VIII)

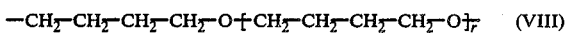

in which r denotes a number from 1 to 200, preferably 1 to 50 and especially 2 to 25, or (b) a divalent group of the formula (IX)

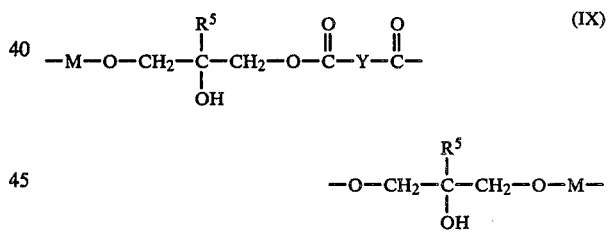

in which M represents [$R^3$ a)] and Y represents a divalent group of the formulae (II), (III) or (IV), or a divalent aliphatic radical which has 1–8 carbon atoms, preferably akylene or alkenylene, which can be substituted by OH groups and/or HOOC groups, or a divalent cycloaliphatic radical which has 6–25 carbon atoms, preferably cyclized alkylene or alkenylene, which can be substituted by hydroxyl and/or carboxyl groups, or a divalent polyester radical, preferably a linear $\alpha,\omega$ divalent polyester radical, of average molecular weight 500–100,000, preferably 1,000–20,000 and especially 1,500–10,000 which is composed of optionally substituted aromatic and/or aliphatic and/or cycloaliphatic dicarboxylic or tricarboxylic acid units and aliphatic $(C_2-C_8)$-diol units or aliphatic dihydroxypolyether units having up to 200 linear, branched or cyclic $(C_2-C_8)$-monomer units in the polyether group, or a divalent group of the formula (X)

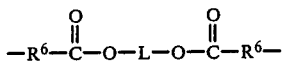

$$-R^6-\overset{O}{\overset{\|}{C}}-O-L-O-\overset{O}{\overset{\|}{C}}-R^6- \quad (X)$$

in which $R^6$ denotes a divalent radical belonging to the group comprising phenylene, tetrahydrophenylene, hexahydrophenylene, carbohydroxyphenylene, vinylene, methylene, ethylene, ($C_3$–$C_{10}$)-alkylene, naphthylene, tetrahydronaphthylene and decahydronaphthylene, and L denotes a divalent radical, preferably a linear and/or branched, α,ω-divalent radical, of a polyester group, of a poly-($C_2$–$C_4$)-alkylene glycol ether group, of a poly-($C_1$–$C_8$)-alkyleneoxy-group, of a polytetrahydrofuran group or of a polycaprolactone group, it being possible for the groups mentioned to be low-molecular to high-molecular and to have average degrees of polymerization from 1 to 200, and $R^4$ is H or

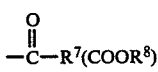

$$-\overset{O}{\overset{\|}{C}}-R^7(COOR^8)_t$$

in which t denotes a number from 1 to 3 and $R^7$ denotes a divalent or polyvalent, linear or branched or cyclic, aliphatic radical having 1–8 carbon atoms, or a divalent or polyvalent, aromatic or aromatic-aliphatic radical having 6–14, preferably 6–10 and especially 6, carbon atoms, or, if t is nought, denotes the group —$COOR^8$, and $R^8$ denotes hydrogen or the cationic radical of a basic compound, preferably an organic basic compound or an inorganic basic compound, subject to the provisio that $R^4$ represents H at least to the extent of 5 mol %, preferably at least 10 mol % and especially at least 20 mol %, relative to $R^4$.

The invention also relates to a process for the preparation of compounds of the formula (I) and solutions or aqueous dispersions thereof, which comprises reacting (A) polyamino compounds of the general formula (Ia)

$$H_2N-R-NH_2 \quad (Ia)$$

in which R has the same meaning as in formula (I), if appropriate as a mixture with monoamines of the formulae (IIa) and/or (IIIa)

$$R^1-NH_2 \quad (IIa)$$

$$R^2-NH_2 \quad (IIIa)$$

in which $R^1$ and $R^2$ have the same meaning as in formula (I), with the exception of $H_2N-R-$ and H, with (B) polycarbonates of the general formula (IVa)

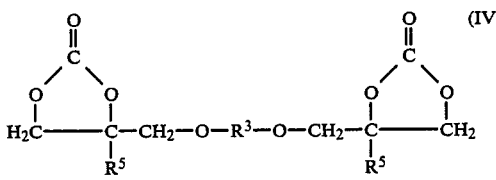

in which $R^3$ and $R^5$ have the same meanings in formula (I), the reaction being carried out, if appropriate, at elevated temperatures and/or, if appropriate, with the addition of inert organic solvents, and, if appropriate, (C) reacting the reaction product further with polycarboxylic acids of the general formula (Va)

$$H-R^4 \quad (Va)$$

in which $R^4$ has the same meaning as in formula (I), with the exception of H, or with anhydrides thereof, if appropriate at elevated temperatures, to give a product having an acid number between 0 and 100, if appropriate isolating the reaction product or, if appropriate, dissolving it in a solvent and/or, if appropriate, (D) neutralizing the reaction product partly or completely by adding a basic compound, preferably an organic base, and, if appropriate, (E) mixing it, if appropriate including the solvent, vigorously with an amount of water such that an aqueous dispersion which has a solids content of up to 75% by weight, preferably 0.1 to 75% by weight, in particular 5 to 65% by weight and particularly preferentially 20 to 55% by weight, relative to the dispersion, is obtained.

The reactions in process stages (A) to (C) can be carried out at normal temperature or at elevated temperatures in a customary manner. They are preferably effected within the temperature range from 20° to 200° C., in particular 50° to 150° C. and particularly preferentially 80° to 120° C.

In the process stages (A) to (C), the reactants can be brought into reaction without a diluent or with the addition of inert solvents.

In this regard it is immaterial whether the polyamino component (A) is taken initially and the polycarbonate component (B) is metered in, or whether these reactants are fed into the reaction vessel in the reverse sequence. It is preferable to take the component (B) initially and to meter in the component (A).

In general, the components (A) and (B) are employed in a molar ratio of about 2:1 to 1:2, preferably 1.5:1 to 1:1.5 and particularly preferentially 1.1:1 to 1:1.1. In the process sequence according to the invention it is also possible for reaction products in which the end groups can be different from those of the compounds of the formula (I) to be formed as the result of incomplete reaction of the reactants (A), (B) and, if appropriate, (C). Byproducts of this type can be formed in varying amounts which can, in general, remain in the reaction product according to the invention, since the further use, according to the invention, of the reaction product is generally not impaired by these byproducts and their spectrum of properties.

In addition, a statistical mixture of macromolecules of the formula (I) having a varying molecular size always results in the process according to the invention, account being taken of the molecular weight distribution of these molecules by the range of values for n as an average value in formula (I).

The amount of solvent which may be employed is as small as possible and serves the purpose of keeping the viscosity of the reaction melt or of the resulting resin melt sufficiently low for this melt to remain easily stirrable.

The invention also relates to resin compositions containing, preferably in a major amount and especially as the principal resin component, polymers of the formula (I) which contain urethane groups.

Preferred inert organic solvents are those having a boiling point above 90° C. It is also possible to employ mixtures of solvents. The selection of solvent is not critical. However, preferred solvents or solvent mixtures are those which are miscible with water, such as, for example, N-methylpyrrolidone (NMP) or dimethyl diglycol (DGDME). They are preferably added to the resin mixture all at once or in portions, in amounts of 0–100% by weight, in particular 0–50% by weight and particularly preferentially 0–20% by weight, relative to the resin mixture. When the aqueous dispersions of the compounds of the formula (I) are prepared, this solvent component generally remains in the dispersion, so that it should be kept as small as possible from the outset.

It is preferable to employ the compounds described below as the starting components (A), (B), (C), (D) and (E) in the process according to the invention;

A. Polyamino compounds of the general formula (Ia)

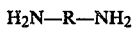

such as, preferably, (a) diamines in which R in formula (Ia) denotes alkylene which has 1–25, in particular 3–15 and particularly preferentially 5–10, C atoms and which can be linear, branched, cyclic, saturated or unsaturated, or (b) diamines in which R in formula (Ia) has the meaning of formula (II) or (III), i.e. diamines of polyethers of the formulae (Ib) or (Ic)

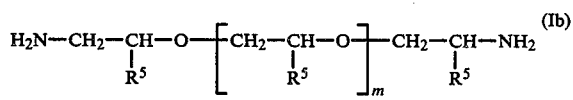

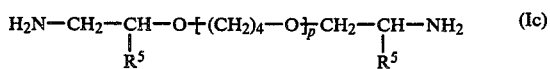

in which $R^5$ is H or $CH_3$ and m and p are 0–10,000, in particular 1–50 and particularly preferentially 3–30, or (c) polyamino compounds in which R in formula (Ia) has the meaning of formula (IV), i.e. polyamino compounds of the formula (Id)

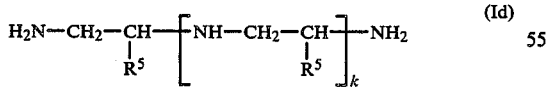

in which $R^5$ is H or $CH_3$ and k is 0–20, in particular 1–5, or (d) polyamino compounds as listed above under (a) to (c), as mixtures with one another or as mixtures with monoamines of the formulae (IIa) and/or (IIIa), such as alkylamino compounds, alkylarylamino compounds and especially aminohydroxy compounds.

B. Polycarbonates of the general formula (IVa)

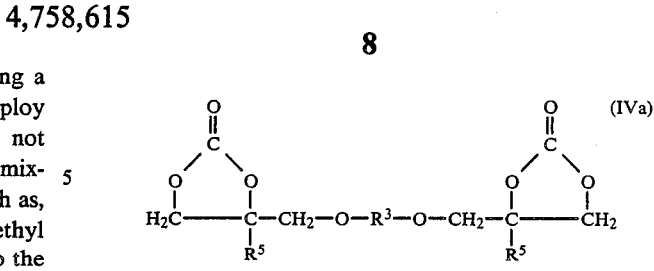

such as polycarbonates of polyepoxides, in particular bisepoxides, such as, for example, diglycidyl ethers, diglycidylhydantoins, diglycidyl esters, diglycidyl urethanes or diglycidyl amides, preferably biscarbonates of the formula (IVa), such as (a) reaction products, with $CO_2$, of diglycidyl ethers of compounds of the formula (IVb)

$$HO-R^3-OH \qquad (IVb)$$

in which $R^3$ has the same meaning as in formula (IVa), or mixtures thereof, in particular compounds of the formula (IVb) belonging to the group comprising ($C_1$–$C_{25}$)-alkanediols, bisphenols, such as bisphenol A or bisphenol F, polyethers, such as polypropylene glycol or polyethylene glycol, copolymeric or block-copolymeric polyethylene glycol/polypropylene glycol ethers or polytetrahydrofuran (polyTHF), or (b) polycarbonates of the formula (IVa), such as reaction products of the general formula (IVc)

(IVc)

[structure]

in which $R^5$, M and Y have the same meanings as in formula (IX) and which can be obtained by reacting polycarboxylic acids of the general formula (IVd)

$$\begin{array}{c} HOOC-Y-COOH \\ | \\ (COOH)_w \end{array} \qquad (IVd)$$

in which w denotes 0–200, in particular polycarboxylic acids of the formula (IVd) belonging to the group comprising aliphatic and/or aromatic polycarboxylic or dicarboxylic acids, linear and/or branched oligomers and/or polymers having carboxyl end groups, preferably reaction products of aliphatic and/or aromatic dicarboxylic acids or anhydrides thereof, with difunctional OH.compounds of the formula (IVb) or OH-functional, linear and/or branched polymers, in particular linear or branched polyesters, to give compounds of the general formula (IVe)

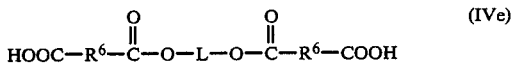

$$\text{HOOC}-\text{R}^6-\overset{\overset{\text{O}}{\|}}{\text{C}}-\text{O}-\text{L}-\text{O}-\overset{\overset{\text{O}}{\|}}{\text{C}}-\text{R}^6-\text{COOH} \quad \text{(IVe)}$$

in which L and $R^6$ have the same meanings as in formula (X), and reacting the compounds of the formula (IVe) further with carbonate/epoxy compounds such as can be obtained by at least partial carbonation of monoepoxy and/or polyepoxy compounds, preferably diepoxy compounds, or by mixing monoepoxy and/or polyepoxy compounds with monocarbonates and/or polycarbonates.

It is preferable to react the compounds of the formula (IVe) with carbonate/epoxy compounds which have been prepared from diepoxides by carbonating 30–70, preferably 40–60 and especially 45–55, mol % of the epoxide groups present, to give compounds of the formula (IVc).

It is particularly preferable to react the compounds of the formula (IVe) with carbonate/epoxy compounds of the general formula (IVf)

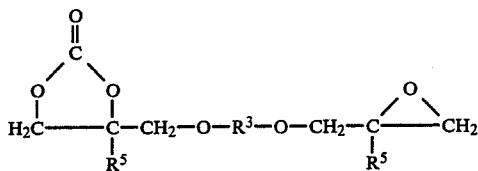

in which $R^3$ has the same meaning as in formula (IVb) and $R^5$ has the same meaning as in formula (I), or the compounds of the formula (IVe) are reacted, with the formation of compounds of the formula (IVc), with carbonate/epoxy compounds such as can be obtained by partial elimination of $CO_2$ from biscarbonates of the formula (IVa) prepared from diols of the formula (IVb), or the compounds of the formula (IVe) are reacted with carbonate/epoxy compounds such as can be obtained by partial carbonation of the diglycidyl ethers of diols of the formula (IVb), or (c) polycarbonates of the formula (IVa), such as reaction products which can be obtained from biscarbonates, with the elimination of $CO_2$, by partial etherification with compounds containing several OH-functional groups, preferably diols and OH-functional polyesters.

The following are examples of suitable polyamino compounds of the formula (Ia):

Diamines in which R in formula (Ia) represents an aliphatic or aromatic $C_1$–$C_{25}$ hydrocarbon radical, preferably, for example, ethylenediamine, 1,2-propylenediamine, 1,3-propylenediamine, tetramethylenediamine, pentamethylenediamine, hexamethylenediamine, 2,2',4-trimethylhexamethylenediamine, neopentanediamine, diaminooctane or TCD-diamine (=3(4)-bis-(aminomethyl)-tricyclo[5,2,1$^{2,6}$]decane).

Diamines of polyethers of the formulae (Ib) or (Ic), preferably, for example, those in which m or p in formula (Ib) denotes 0–1,000, in particular 1–100.

Polyamino compounds of the formula (Id), preferably, for example, those in which k in formula (Id) denotes 0–10, preferably 0–5 and especially 0–2.

Mixtures of the polyamino compounds mentioned above with one another or with monoamines of the formulae (IIa) or (IIIa), such as, for example, alkylamino, arylamino or alkylarylamino compounds, preferably aminohydroxy compounds.

The following are examples of suitable polycarbonates of the formula (IVa):

Polycarbonates of polyepoxides, preferably bisepoxides, such as, for example, diglycidyl ethers, diglycidylhydantoins, diglycidyl esters, diglycidyl urethanes or diglycidyl amides, preferably biscarbonates of the formula (IVa). The polycarbonates which can be employed in accordance with the invention and the process for their preparation are known in principle (cf., for example, U.S. Pat. Nos. 4,407,995 and 4,409,349, PCT (WO) Patent Application No. 84/03701 and German Patent Applications P No. 3,529,263.6 and P No. 3,600,602.5.

Preferred polycarbonates are compounds such as, for example, reaction products, with $CO_2$, of diglycidyl ethers of polyhydroxy compounds of the formula (IVb), the formula (IVb) preferably representing the following compounds or mixtures of these compounds:

($C_1$–$C_{25}$)-alkanediols, preferably ($C_2$–$C_{10}$)-alkanediols and especially ($C_5$–$C_{10}$)-alkanediols, polyethers, such as polyethylene glycol, polypropylene glycol or poly-THF, or copolymers thereof, preferably polypropylene glycol and especially polypropylene glycol having a molecular weight less than 2,000, bisphenols, preferably bisphenol A or bisphenol F, or reaction products corresponding to the formula (IVc) which can, for example, preferably be obtained from polycarboxylic acids of the formula (IVd), such as, for example, aliphatic and/or aromatic polycarboxylic acids, preferably dicarboxylic acids, such as oxalic acid, malonic acid, succinic acid, glutaric acid, adipic acid, maleic acid, fumaric acid, itaconic acid, phthalic acid, terephthalic acid, tetrahydrophthalic acid or naphthalenedicarboxylic acids, in particular phthalic acid, tetrahydrophthalic acid and hexahydrophthalic acid, or oligomeric or polymeric compounds of the formula (IVe) in which the carboxyl groups are in a terminal position and which can, for example, preferably be obtained by reacting diols of the formula (IVb) and/or OH-functional linear and/or branched polymers, preferably linear or branched polyesters, with aliphatic and/or aromatic dicarboxylic acids or anhydrides thereof, preferably products of the formula (IVe) which are obtained by reacting OH-functional polyesters, polypropylene glycols or aliphatic and/or aromatic ($C_1$–$C_{25}$)-diols with carboxylic anhydrides, such as phthalic anhydride, tetrahydrophthalic anhydride, succinic anhydride or maleic anhydride, preferably phthalic anhydride and/or tetrahydrophthalic anhydride, and reacting these polycarboxylic acids of the formula (IVd) with compounds, such as, for example, carbonate/epoxy compounds, which can be obtained by at least partial carbonation of monoepoxy and/or polyepoxy compounds, preferably diepoxy compounds, or by mixing monoepoxy and/or polyepoxy compounds with monocarbonates and/or polycarbonates, preferably carbonate/epoxy compounds formed from diepoxides prepared by carbonating 30–70, preferably 40–60 and especially 45–55, mol % of the epoxide groups present, in particular monocarbonate/monoepoxy compounds of the formula (IVf) in which the diol component of the corresponding diglycidyl ether is a compound of the formula (IVb).

Further examples of precursors which can be employed in accordance with the invention are monocarbonate/monoepoxy compounds of the formula (IVf)

based on bisphenol A or bisphenol F and on polypropylene glycol diglycidyl ethers, or carbonate/epoxy compounds which can be obtained by reacting biscarbonates of the formula (IVa) with diglycidyl ethers of diols of the formula (IVb) (preferably in a biscarbonate:-diol molar ratio such as 2:1), $CO_2$ being eliminated. In this regard, it is preferable to employ the biscarbonates of bisphenol A or bisphenol F diglycidyl ethers and of polypropylene glycol diglycidyl ethers, the dicarbonate of bisphenol A diglycidyl ether being particularly preferred, or carbonate/epoxy compounds composed of partially carbonated diglycidyl ethers of diols of the formula (IVb) (preferably of complex diols composed of polycarboxylic acid and diol units in a molar ratio of 1:1 to 1:2). It is particularly preferable in this regard to react linear and/or branched polyesters having OH numbers between 20 and 250 with diglycidyl ethers of diols of the formula (IVb), and subsequently to carbonate the reaction products. It is particularly preferable to react linear polyesters having OH numbers between 30 and 200 with bisphenol A diglycidyl ethers, and to carry out carbonation subsequently.

The preparation of the process components A described above (=polyamino compounds of the general formula (Ia)) and B (=polycarbonates of the general formula (IVa)) for the process stages (A) and (B) according to the invention can be effected in solution or, if appropriate, in the melt. Preferred solvents are inert solvents having boiling points above 90° C., preferably belonging to the group comprising ketones, glycol ethers, esters, pyrrolidones or mixtures thereof, in particular glycol ethers and pyrrolidones or mixtures thereof.

In the reaction, according to the invention, of the components A and B, the dioxol-2-one radicals of the carbonate groupings in the component B react selectively with the primary amino groups in the component A with the formation of urethane groups. Formation of urethane groups takes place in this manner without the use of expensive monomeric isocyanate components. The latter are also undesirable as residual monomers in the end product and raise physiological problems.

In a preferred embodiment of the process according to the invention the reaction products obtained in accordance with process stage (C) from the process components (A) (=polyamino compounds of the general formula (Ia)) and (B) (=polycarbonates of the general formula (IVa) are reacted with such an amount of a polycarboxylic acid of the formula (Va) or the anhydride thereof that an acid number of 0–100, preferably 1–80 and especially 5–60 is set up in the reaction product. It is preferable to employ the anhydrides of polycarboxylic acids, preferably, for example, succinic anhydride, maleic anhydride, phthalic anhydride, tetrahydrophthalic anhydride and trimellitic anhydride.

Like the binders obtained in process stage (B), the binders prepared by process stage (C) according to the invention can also be employed as such in a customary manner in formulations of adhesives or paints, preferably in non-aqueous systems. For use in aqueous systems, it is preferable to react the binders obtained by process stage (C) further in accordance with process variants (D) or (E).

In a process variant which is also preferred, the reaction product obtained by process stage (C) is neutralized, at least partly or completely, in process stage (D) according to the invention by adding bases, preferably amino compounds, preferably in the melt or with the addition of inert organic solvents. Bases which are particularly preferred are aminohydroxy compounds, in particular aliphatic aminohydroxy compounds, such as, for example, monoethanolamine, diethanolamine, triethanolamine, monomethylethanolamine, dimethylethanolamine, monoisopropanolamine, triisopropanolamine, 2,2'-aminoethoxyethanol, aminoethylethanolamine, diethylethanolamine, dipropylethanolamine, butylethanolamine, diisopropylethanolamine, dibutylethanolamine, 3-aminopropanol, 3-dimethylaminopropanol, 2-aminobutan-1-ol or 2-amino-2-methylpropanol.

The conversion of the binder mixture obtained after process stage (D) into an aqueous dispersion can be carried out in a further process variant in process stage (E) according to the invention, either by introducing the polymer or a solution thereof into the aqueous phase or by adding water to the polymer melt or polymer solution, specifically at temperatures of, preferably, between 25° and 100° C., especially 30°–80° C. It is preferable to employ the polymer melt for the preparation of dispersions.

If appropriate, emulsifiers and/or protective colloids can be added in order to assist the dispersion process or to increase the stability of the aqueous binder dispersion.

In the event that the polymer is introduced into water or into an aqueous solution of emulsifier and/or protective colloid, it is necessary to bear in mind the high viscosity in certain circumstances of the polymer solution, which can render it necessary to use appropriate metering devices (for example the gear pump). If necessary, the polymer solution or melt must be diluted in a manner which is known per se by means of a suitable inert solvent or solvent mixture, which can be removed again by distillation when dispersion is complete.

In the event that water or aqueous solutions of emulsifiers and/or protective colloids are metered into the polymer mixture, the latter will, as a rule, pass through a pronounced viscosity maximum. It is therefore necessary to ensure, if appropriate, that the stirring units are adequately powerful.

The aqueous dispersions prepared in accordance with the invention have a solids content of, preferably, up to 75% by weight, in particular 0.1 to 75, particularly preferentially 5 to 65 and above all 20 to 55%, by weight.

Binder solutions according to the invention can have any solids content customarily imaginable.

In a preferred embodiment, the binder or the corresponding aqueous dispersion thereof according to the invention, composed of compounds of the formula (I), is employed in formulations of adhesives or paints, in particular in aqueous baking lacquer formulations, for example, in combination with further reactive components, such as, for example, masked or non-masked isocyanates or polyisocyanates, preferably reactive resins and particularly melamine and/or alkyd and/or epoxy resins.

In particular, the binders of the formula (I) according to the invention or aqueous dispersions thereof, in combination with the reactive resins mentioned above, preferably water-dispersible reactive resins, are very suitable for the preparation of so-called fillers or hydro-fillers. The preparation of such non-aqueous or aqueous paint formulations is effected in a customary manner by adding customary additives.

The advantage, containing decisive and surprising properties, of the binders, according to the invention, of the formula (I) and solutions thereof or dispersions thereof when used in (if appropriate aqueous) paint systems, compared with the state of the art is achieved because the binders according to the invention or solutions or dispersions thereof can contain, in the polymer chain, not only urethane groupings, but also a relatively large number of free OH groups which are available, for example, for crosslinking reactions with appropriate reactive resins, such as epoxide, maleate, melamine and acrylate resins. In a preferred embodiment, crosslinking of this type is effected by mixing with melamine resins, applying the mixture as a coating or lacquer, for example, and subsequently baking.

The invention also relates therefore to the use of compounds of the formula (I) in solid or powder form, in solution or in an aqueous dispersion, preferably in solution or in an aqueous dispersion, in particular in an aqueous dispersion, for the preparation of coatings, paints or adhesives, preferably baking coatings or baking lacquers, in particular baking lacquers, as a mixture with reactive melamine resins as an extraneous crosslinking agent.

The invention also relates to mixtures of compounds of the formula (I) with reactive resins, such as epoxide, maleate, melamine and acrylate resins, preferably melamine resins, in customary mixing ratios, in a solid or powder form or in a dissolved form or in a dispersed form, preferably in the form of an aqueous dispersion, and to a process for the preparation of the mixtures by mixing the components in the form desired in their particular case and in the desired mixing ratio.

The invention also relates to the use of the mixtures mentioned above for the preparation of baking coatings, baking lacquers, hydro-baking coatings, hydro-baking lacquers and adhesives. The preparation of hydro-fillers and the use thereof on metallic and nonmetallic surfaces, preferably on metallic surfaces, is particularly preferred.

In combination with reactive resins, such as, for example, melamine resins, fillers and hydro-fillers formulated free from isocyanates by means of binders according to the invention or aqueous dispersions thereof can produce on metals, in accordance with the invention, baking coatings which have excellent impact deep-drawing values which, for example on sheet steel, can be within the range from 80 to 100 in.lb (determined as specified in ASTM D 2794-69 (reapproved 1974)). As against this, baking coatings prepared using other known isocyanate-free hydro-fillers of the state of the art exhibit, by way of comparison, impact deep-drawing values on sheet steel of only approx. 10 in.lb. The coatings are cured by baking in a customary manner at the lowest possible baking temperatures. These are preferably within the range from 100° to 180° C.

When compounds, according to the invention, of the formula (I) are applied from solutions in organic solvents, neutralization of the compounds of the formula (I) is not necessary, but is possible, using any desired bases, preferably organic bases, and can be advantageous in some cases. On the other hand, when compounds of the formula (I) are applied from an aqueous dispersion, partial or complete neutralization of the compounds of the formula (I) is always necessary. This can be effected by using any desired basic compounds. Organic bases, in particular organic aminohydroxy compounds, are preferred. When application is made from an aqueous dispersion, the film formation of the compounds of the formula (I) after the dispersion layer applied has been exposed to the air or dried must take place at the latest when the coating composition or the lacquer layer is baked. However, it is advantageous if this film formation takes place rapidly and in a trouble-free manner at fairly low temperatures in the course of the drying process.

Inter alia, the structure of the radical $R^3$ in formula (I) can have a decisive influence on the elastic properties of baked paint films or coating compositions based on compounds of the formula (I). For example, long aliphatic radicals $R^3$ can, in accordance with the invention, produce soft and elastic polymer properties, and shortening the radicals $R^3$ can result in hard polymers. Particularly hard to glass-hard products can be obtained using aromatic radicals $R^3$.

The glass transition temperature $T_G$ of the radical $R^3$ forming the so-called soft phase in the molecules of the formula (I) could, for example, be taken as a measure of the low-temperature properties of hydro-filler paints based on compounds of the formula (I), particularly for their behavior towards impact by stones on motor vehicle coachwork sheets under cold conditions. The lower the glass transition temperature $T_G$ of the radical $R^3$, the more advantageous the paint properties at low temperatures. The $T_G$ of $R^3$ in compounds of the formula (I) for hydrofiller paints is preferably below 20° C., especially below 0° C. and particularly preferentially below $-10°$ C. Requirements of this type can be met without difficulty, for example using, inter alia, radicals $R^3$ based on polyesters or polyethers.

As can also be deduced from the formula (I), the OH groups (i.e. $R^4O$ groups in formula (I)) available for extraneous crosslinking reactions in the baking process are in the the $\beta$-position relative to the oxygen atom of the urethane group in the compounds of the formula (I), which results in surprisingly advantageous paint properties.

Just like the paint formulations in powder form according to the invention or the paint formulations in the form of binder solutions in organic solvents, the hydrofiller paints based on binders, according to the invention, of the formula (I) can also be applied without problems in the form of an aqueous dispersion to the metal surface to be coated by electrostatic spray application (ESTA application). If need be, dip coatings, inter alia, for example, anionic or electro-neutral application, preferably anaphoretic application, in a dip-painting bath are of course also possible.

The invention is illustrated in greater detail by means of the Examples below.

In the following Examples, P/wt. denotes parts by weight.

Unless otherwise specified, the analytical determinations relate to the whole batch in each case.

EXAMPLE 1

Preparation of an OH-functional linear polyester as a precursor

Apparatus:
4-necked flask of 3 liters' capacity equipped with stirrer, thermometer, column and water separator. Raw materials: figures in grams

| Adipic acid | 818 g |
| Hexanediol | 820 g |

| -continued | |
|---|---|
| Recycle xylene approx. | 100 g |

Procedure:

The raw materials, apart from the recycle xylene, are put into the flask, which is evacuated and restored to normal pressure with nitrogen. The mixture is heated to 160° C. in the course of 2.5 hours and the recycle xylene is added. The temperature is raised to 190° C. in the course of 4.5 hours and is kept at this level for 1.5 hours. The temperature is raised to 200° C. and is kept at this level for 6 hours. When the acid number is 4.8 and the water of reaction is 200 g, the mixture is cooled to 180° C. and the recycle xylene is removed in vacuo. The OH number (OHN) and the acid number (AN) of the reaction product are determined in a customary manner as characteristic values.

Characteristic values:
OHN: 108
AN: 4.8

EXAMPLE 2

Preparation of an OH-functioal linear polyester as a precursor

Apparatus as in Example 1
Raw materials:

| Adipic acid | 788 g |
|---|---|
| Hexanediol | 850 g |
| Recycle xylene approx. | 100 g |

Procedure:

The raw materials, apart from the recycle xylene, are put into the flask, which is evacuated and restored to normal pressure with nitrogen. The mixture is heated up to 160° C. in the course of 2.5 hours and the recycle xylene is added. The temperature is raised to 190° C. in the course of 4.5 hours and is kept at this level for 1.5 hours. The temperature is raised to 200° C. and is kept at this level for 6 hours. When the acid number is 4.0 and the water of reaction is 194 g, the mixture is cooled to 180° C. and the recycle xylene is removed in vacuo. The characteristic values are determined analogously to Example 1.

Characteristic values:
OHN: 143
AN: 4.0

EXAMPLE 3

Preparation of OH-functional linear polyesters (a), (b) and (c) as precursors

The starting components listed under (a), (b) and (c) are melted under nitrogen in a 3-liter distillation flask and are subjected to polycondensation at an internal temperature of 160°-240° C. The volatile constituents are removed by distillation at a head temperature of 105°-110° C., until the reaction mixture has reached an acid value of <8. The last residues of unreacted polyol are removed by the application of a vacuum (240° C./100 mm Hg), and the reaction product is cooled to room temperature.

The quantities of constituents (P/wt.) listed below were employed for the linear polyesters (a), (b) and (c) obtained as reaction products in 3 analogous tests, and the acid numbers and OH numbers of the polyesters obtained in each case were determined as characteristic values in a customary manner.

| Constituents (P/wt.) and characteristic values | Polyesters (a) | (b) | (c) |
|---|---|---|---|
| Isophthalic acid | — | 166 | 166 |
| Adipic acid | 584 | 438 | 438 |
| 1,6-Hexanediol | 566 | 566 | 482.4 |
| Trimethylolpropane | — | — | 141.6 |
| Acid number | 7.8 | 6.8 | 6.1 |
| OH number | 86 | 73 | 149 |

EXAMPLE 4

Preparation of a compound of the formula (I)

300 P/wt. of a linear polyester prepared in accordance with Example 1 (OH number 108) and 85.5 P/wt. of phthalic anhydride are reacted at 120° C. in a 5-liter reactor equipped with a stirrer, a reflux condenser, an internal thermometer and a metering device, to give a product of AN 84. 258.4 P/wt. of bisphenol A diglycidyl biscarbonate (epoxide number 0.1) and 3 P/wt. of triethylammonium bromide as catalyst and 285 P/wt. of methoxypropyl acetate are added at 150° C., and the mixture is reacted with stirring until the AN is 4. 32 P/wt. of hexamethylenediamine are added at 100° C., and the mixture is reacted until the residual amine number is 2. 140 P/wt. of phthalic anhydride are added, and the mixture is kept at 100° C. for 90 minutes and diluted with methoxypropyl acetate to a solids content of 50% by weight of the compound of the formula (I). This gives a clear, viscous solution having the following characteristic values:

Viscosity: 2,985 mPa.s
AN (100% strength) 14
OHN (100% strength) 89

The solid component can be obtained in a solvent-free form by distilling off the solvent.

EXAMPLE 5

Preparation of a compound of the formula (I)

300 P/wt. of a linear polyester prepared in accordance with Example 2 (OH number 143) and 113 P/wt. of phthalic anhydride are reacted at 120° C. in a 5-liter reactor equipped with a stirrer, a reflux condenser, an internal thermometer and a metering device, to give a product of AN 102. 345 P/wt. of bisphenol A diglycidyl biscarbonate (epoxide number 0.1) and 3 P/wt. of triethylammonium bromide as catalyst and 331 P/wt. of methoxypropyl acetate are added at 150° C., and the mixture is reacted with stirring until it has an AN of 1. 21.8 P/wt. of hexamethylenediamine are added at 100° C., and the mixture is reacted until it has a residual amine number of 3.4. A further 46 P/wt. of 2-ethylhexylamine are added, and the mixture is reacted similarly at 100° C. until it has an amine number of 5.6. 46 P/wt. of phthalic anhydride are added, and the mixture is kept at 100° C. for 90 minutes and is diluted with methoxypropyl acetate to give a solids content of 50% by weight of the compound of the formula (I). This gives a clear, viscous solution having the following characteristic values:

Viscosity: 2,495 mPa.s
AN (100% strength) 12.9
OHN (100% strength) 97.4

The solid component can be obtained in a solvent-free form by distilling off the solvent.

EXAMPLE 6

Preparation of a compound of the formula (I)

146 P/wt. of adipic acid and 1,096 P/wt. of bisphenol A diglycidyl biscarbonate (epoxide number 0.1) and 3 P/wt. of triethylammonium bromide as catalyst and 533 P/wt. of methoxypropyl acetate are reacted at 150° C. with stirring, in a 5-liter reactor equipped with a stirrer, a reflux condenser, an internal thermometer and a metering device, until the mixture has an AN of 1. 163.8 P/wt. of hexamethylenediamine and 348 P/wt. of methoxypropyl acetate are added at 100° C., and the mixture is reacted until it has a residual amine number of 7.4. A further addition is made of 100 P/wt. of 2-ethylhexylamine, and the mixture is reacted similarly at 100° C. until it has an amine number of 7.5. 40 P/wt. of phthalic anhydride are added, and the mixture is kept at 100° C. for 90 minutes and diluted with methoxypropyl acetate to a solids content of 50% by weight of the compound of the formula (I). This gives a clear, viscous solution having the following characteristic values:

Viscosity: 5,638 mPa.s
AN (100% strength) 14.6

The solid component can be obtained in a solvent-free form by distililing off the solvent.

EXAMPLE 7

Preparation of a compound of the formula (I)

146 P/wt. of adipic acid and 900 P/wt. of bisphenol A diglycidyl biscarbonate (epoxide number 3.9) and 3 P/wt. of benzyltrimethylammonium hydroxide as catalyst and 448 P/wt. of methoxypropyl acetate are reacted at 120° C. with stirring, in a 5-liter reactor equipped with a stirrer, a reflux condenser, an internal thermometer and a metering device, until the mixture has an AN of 1. 103.9 P/wt. of hexamethylenediamine and 340 P/wt. of methoxypropyl acetate are added at 100° C., and the mixture is reacted until it has a residual amine number of 3.5. A further addition is made of 60.2 P/wt. of 2-ethylhexylamine, and the mixture is reacted similarly at 100° C. until it has an amine number of 7.5. 31.3 P/wt. of phthalic anhydride are added, and the mixture is kept at 100° C. for 90 minutes and is diluted with methoxypropyl acetate to a solids content of 50% by weight of the compound of the formula (I). This gives a clear, viscous solution having the following characteristic values.

Viscosity: 12,190 mPa.s
AN (100% strength) 11.6

The solid component can be obtained in a solvent-free form by distilling off the solvent.

EXAMPLE 8

Preparation of an aqueous dispersion of a compound of the formula (I)

500 P/wt. of bisphenol A diglycidyl biscarbonate (epoxide number: 0.027) are reacted with 171.7 P/wt. of trimethylhexamethylenediamine in a mixture of 100 P/wt. of N-methylpyrrolidone (NMP) and 100 P/wt. of dimethyldiglycol (DGDME) at 100° C., in a 5-liter reactor equipped with a stirrer, a reflux condenser, an internal thermometer and metering devices, until the mixture has an amine number of 7 or less.

52 P/wt. of trimellitic anhydride and 50 P/wt. of 1:1 NMP/DGDME are then added, and the reaction is continued until the mixture has an acid number of 26. 48 P/wt. of dimethylethanolamine are added, and stirring is continued for 2 hours at 100° C. 1,350 P/wt. of demineralized water (D-water) are then added, with vigorous stirring.

This gives a stable aqueous dispersion having a solids content, of the compound of the formula (I), of approx. 33% by weight.

Acid number (relative to solid resin): 32.2
pH: 8.9

EXAMPLE 9

Preparation of an aqueous dispersion of a compound of the formula (I)

400 P/wt. of a polyester prepared in accordance with Example 3(b) (OH number 73) and 77 P/wt. of phthalic anhydride are reacted at 160° C., in a 5-liter reactor equipped with a stirrer, a reflux condenser, an internal thermometer and metering devices, to give a product of acid number 67. 179 P/wt. of bisphenol A diglycidyl monocarbonate (epoxide number 4.65) and 80 P/wt. of 1:1 NMP/DGDME and 4 P/wt. of benzyldimethylamine as catalyst are added at 105° C., and the mixture is reacted, with stirring, until it has an epoxide number of 0.17. 41 P/wt. of trimethylhexamethylenediamine are added at 100° C., and the mixture is reacted until it has a residual amine value of 7 or less. 49.4 P/wt. of trimellitic anhydride are added, and the mixture is kept at 105° C. for 3 hours, and 46.2 P/wt. of dimethylethanolamine are then added. Dispersion is carried out at temperatures of 100°–50° C. by adding 1,110 P/wt. of D-water, with vigorous stirring.

This gives a stable aqueous dispersion having a solids content, of the compound of the formula (I), of approx. 37% by weight.

Acid number (relative to solid resin): 37.6
pH: 8.9

EXAMPLE 10

Preparation of an aqueous dispersion of a compound of the formula (I)

297 P/wt. of polyethylene glycol ($M_n$ 4000; OH number 27.2) are reacted with 21.9 P/wt. of tetrahydrophthalic anhydride at 160° C., in a 5-liter flask equipped with a stirrer, a reflux condenser, an internal thermometer and metering devices, until the acid number is 28 or less. 49.5 P/wt. of bisphenol A diglycidyl monocarbonate (epoxide number 4.65), 60 P/wt. of a 1:1 mixture of N-methylpyrrolidone and diglycol dimethyl ether and 3 P/wt. of benzyldimethylamine as catalyst are then added at 100° C., and the mixture is reacted at 100° C. until it has an epoxide number of 0.14 or less. 11 P/wt. of trimethylhexamethylenediamine are then added (at 100° C.), and the mixture is reacted until it has an amine number of 9 or less. Subsequently, 13.4 P/wt. of trimellitic acid are reacted with the mixture at 100° C. until the acid number is 17 or less. The mixture is neutralized with 12.4 P/wt. of dimethylaminoethanol (approx. 1 hour at 100° C.), and 550 P/wt. of D-water are then added, with vigorous stirring.

This gives a stable aqueous dispersion having a solids content, of the compound of the formula (I), of approx. 37% by weight.

Acid number (relative to solid resin): 15.8
pH: 8.5

EXAMPLE 11

Preparation of an aqueous dispersion of a compound of the formula (I)

500 P/wt. of bisphenol A diglycidyl ether-biscarbonate (epoxide number: 0.027) are reacted with a solution of 163 P/wt. of trimethylhexamethylenediamine in 200 P/wt. of a 1:1 mixture of N-methylpyrrolidone and diglycol dimethyl ether at 100° C., in a 5-liter flask equipped with a stirrer, a reflux condenser, an internal thermometer and a metering device, until the mixture has an amine number of 6 or less. 52 P/wt. of trimellitic anhydride are then reacted with the mixture at 100° C. until the acid number is 32 or less.

The mixture is neutralized with 48 P/wt. of dimethylaminoethanol (1 hour at 100° C.) and 1,200 P/wt. of D-water are then added, with vigorous stirring.

This gives a stable aqueous dispersion having a solids content, of the compound of the formula (I), of approx. 37% by weight.

Acid number (relative to solid resin): 35
pH: 8.7

EXAMPLE 12

Preparation of an aqueous dispersion of a compound of the formula (I)

400 P/wt. of a linear polyester prepared in accordance with Example 3(b) (OH number 73) are reacted with 82.6 P/wt. of phthalic anhydride at 160° C., in a 5-liter flask equipped with a stirrer, a reflux condenser, an internal thermometer and metering devices, until the mixture has an acid number of 68 or less. 244 P/wt. of bisphenol A diglycidyl monocarbonate (epoxide number 3.65), 150 P/wt. of a 1:1 mixture of N-methylpyrrolidone and diglycol dimethyl ether, and 4 P/wt. of benzyldimethylamine as catalyst are then added at 100° C., and the mixture is reacted at 100° C. until it has an epoxide number of 0.15 or less. 55.7 P/wt. of 3(4)-bis-(aminomethyl)-tricyclo[5.2.1$^{2,6}$]decane (=TCD-diamine) are then added dropwise at 100° C., and the mixture is reacted until it has an amine number of 6 or less. Subsequently, 53.5 P/wt. of trimellitic anhydride are added at 100° C., and are reacted with the mixture until it has an acid number of 32.5 or less.

The mixture is neutralized with 49.6 P/wt. of dimethylaminoethanol (1 hour/100° C.), and 1,185 g of D-water are then added, with vigorous stirring.

This gives a stable aqueous dispersion having a solids content, of the compound of the formula (I), of approx. 37% by weight.

Acid number (relative to solid resin): 39
pH: 7.7

EXAMPLE 13

Binder dispersions according to the invention are tested in the following hydro-filler formulation.

Hydro-filler formulation

An aqueous mixture of a binder dispersion according to the invention and a completely etherified hexamethoxymethylmelamine resin (85:15, solid to solid) is prepared in a mixing vessel using a powerful stirrer, and this mixture is ground with a pigment combination composed of 1 P/wt. of TiO$_2$ (Kronos RN 59) and 1 P/wt. of Blanc fixe (micro) and 0.01 P/wt. of carbon black (LTD) (viscosity approx. 100–200 seconds in a Ford flow cup having an efflux orifice of φ 4 mm).

The pH is adjusted with dimethylethanolamine to a value of 8.3±0.2. The flow viscosity is adjusted to approx. 22 seconds by adding D-water.

When the aqueous filler paint thus prepared has been applied in a customary manner to phosphate-treated steel sheet (Bonder 132) and subsequently baked, the following impact indentation and Erichsen indentation values are achieved:

| Baking conditions: | exposure time (room temperature) | 10 minutes |
|---|---|---|
| | preliminary drying (80° C.) | 10 minutes |
| | baking (160° C.) | 20 minutes |

| Binder dispersion (according to Example | Erichsen indentation (mm) | Impact indentation (in · lb) |
|---|---|---|
| Example 6 | 8.6 | 120 |

What is claimed is:

1. A polymer, containing urethane groups, of the formula (I)

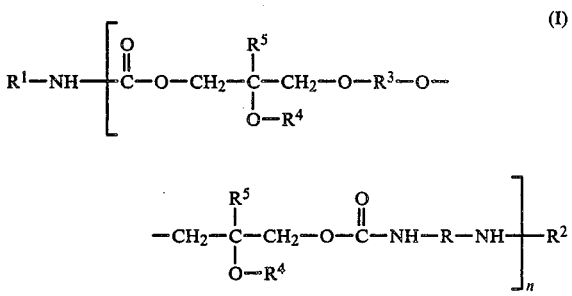

in which R, R$^1$, R$^2$, R$^3$, R$^4$, R$^5$ and n have the following meaning:

n is a number from 1 to 500,

R$^5$ is H and/or CH$_3$,

R is alkylene which has 1–25 carbon atoms and can be linear, branched, cyclic, saturated or unsaturated and can also contain heteroatoms as well as hydroxyl, amine or carboxyl groups, or is a divalent group of the formulae (II), (III) or (IV)

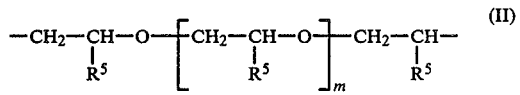

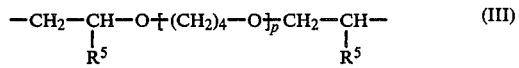

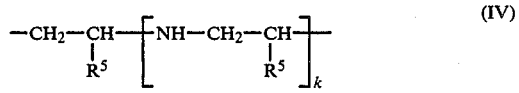

in which m and p are a number from 0 to 1,000 and k is a number from 0 to 20, or mixtures of the groups of the formulae (II), (III) and (IV), R$^1$ is H$_2$N—R— or alkyl which has 1–25 carbon atoms and can be linear, branched, cyclic, saturated or unsaturated and can also contain heteroatoms as well as hydroxyl, amino or carboxyl groups, or is aryl which has 6–14 carbon atoms and can, in addition, be substituted by (C$_1$–C$_8$)-alkyl groups, (C$_1$–C$_8$)-hydroxyalkyl groups or hydroxyl, amino or carboxyl groups, and can also contain heteroatoms, or is alkylaryl which has 7–25 carbon atoms and can, in addition, be substituted by hydroxyl, amino or carboxyl groups and can also contain heteroatoms, $R^2$ is H or $R^1$ or a group of the formula (V)

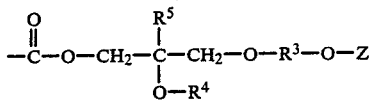

(V)

in which Z can denote one of the groupings

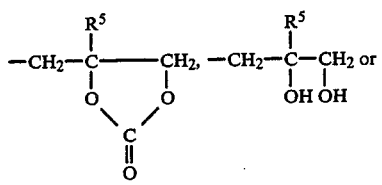

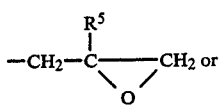

$R^2$ and $R^1$ together represent a cyclization member, the compound of the formula (I) being cyclized, $R^3$ is (a) alkylene which has 1–25 carbon atoms and which can be linear, branched, cyclic, saturated or unsaturated, or a divalent group of the formula (VI)

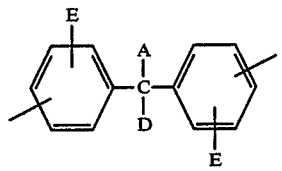

(VI)

in which A and D denote H or ($C_1$–$C_3$)-alkyl and E denotes H or ($C_1$–$C_8$)-alkyl or halogen and the benzene ring in formula (VI) can also be partly or completely hydrogenated, or a divalent bisphenylene radical which is optionally substituted by lower alkyl groups and/or halogen, and in which the benzene rings can also be partly or completely hydrogenated, or a divalent group of the formula (VII)

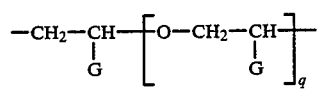

(VII)

in which q denotes a number from 1 to 200 and G denotes H and/or ($C_1$–$C_3$)-alkyl, or a divalent polytetrahydrofuran group of the formula (VIII)

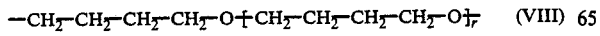

(VIII)

in which r denotes a number from 1 to 200, or (b) a divalent group of the formula (IX)

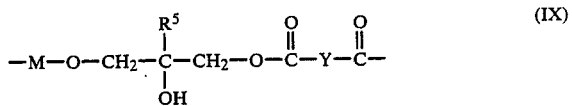

(IX)

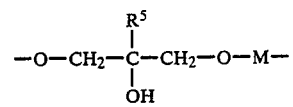

in which M represents [$R^3$ a)] and Y is a divalent group of the formulae (II), (III), (IV) or a divalent, aliphatic radical which has 1–8 carbon atoms and can be substituted by OH groups and/or HOOC groups, or a divalent, cycloaliphatic radical which has 6–25 carbon atoms and can be substituted by hydroxyl and/or carboxyl groups, or a divalent polyester radical of average molecular weight 500–100,000 which is composed of optionally substituted aromatic and/or aliphatic and/or cycloaliphatic dicarboxylic or tricarboxylic acid units and aliphatic ($C_2$–$C_8$)-diol units or aliphatic dihydroxypolyether units, and having up to 200 linear, branched or cyclic ($C_2$–$C_8$)-monomer units in the polyether group, or a divalent group of the formula (X)

(X)

in which $R^6$ denotes a divalent radical belonging to the group comprising phenylene, tetrahydrophenylene, hexahydrophenylene, carbohydroxyphenylene, vinylene, methylene, ethylene, ($C_3$–$C_{10}$)-alkylene, naphthylene, tetrahydronaphthylene or decahydronaphthylene, and L denotes a divalent radical of a polyester group, a poly-($C_2$–$C_4$)-alkylene glycol ether group, a poly-($C_1$–$C_8$)-alkyleneoxy group, a polytetrahydrofuran group or a polycaprolactone group, it being possible for the groups mentioned to be low-molecular to high-molecular and to have average degrees of polymerization from 1 to 200, and $R^4$ is H or

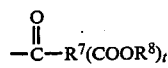

in which t is a number from 1 to 3 and $R^7$ is a divalent or polyvalent, linear or branched or cyclic, aliphatic radical having 1–8 carbon atoms, or a divalent or polyvalent, aromatic or aromatic-aliphatic radical having 6–14 carbon atoms, and $R^8$ denotes hydrogen or the cationic radical of an organic or inorganic basic compound, subject to the proviso that $R^4$ represents H to the extent of at least 5 mol %, relative to $R^4$.

2. A compound as claimed in claim 1, wherein, in formula (I),

R denotes alkylene which has 1–25 carbon atoms and which can be linear, branched, cyclic or saturated and can contain oxygen and/or nitrogen as heteroatoms, or denotes a divalent group of the formula (IV), $R^3$ denotes a divalent group of the formulae (VI) or (IX) and $R^4$ denotes H or

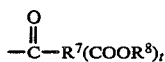

in which $R^7$ represents an aromatic radical having 6–10 carbon atoms.

3. A compound as claimed in claim 1, wherein, in formula (I),

R denotes linear and/or branched alkylene having 3–15 carbon atoms, or a divalent group of the formula (IV) in which k is 1–5, $R^3$ denotes a divalent group of the formula (VI) in which A and D are H or methyl and E is H, or a divalent group of the formula (IX) in which Y is a divalent group of the formula (X) in which $R^6$ represents phenylene, tetrahydrophenylene, hexahydrophenylene, vinylene or ethylene, and L represents a divalent radical of a polyester group, and $R^4$ denotes H or

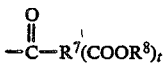

in which $R^7$ represents an aromatic radical having 6–10 carbon atoms.

4. A compound as claimed in claim 1, wherein, in formula (I), $R^4$ represents the group

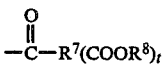

to the extent of 80 mol %, relative to $R^4$, and $R^8$ represents a cationic radical of an organic basic compound, and the compounds of the formula (I) are in the form of aqueous dispersions having a solids content of up to 75%, relative to the dispersion.

5. A solution or aqueous dispersion containing the polymers of the formula (I), containing urethane groups, as claimed in claim 1.

6. A resin mixture in the form of a solid, a solution or an aqueous dispersion, which contains polymers of the formula (I) containing urethane groups, as claimed in claim 1.

7. A process for the preparation of compounds of the formula (I) as claimed in claim 1, solutions thereof or aqueous dispersions thereof, which comprises reacting (A) polyamino compounds of the general formula (Ia)

$$H_2N-R-NH_2 \qquad (Ia)$$

in which R has the same meaning as in formula (I), if appropriate as a mixture with monoamines of the formulae (IIa) and/or (IIIa)

$$R^1-NH_2 \qquad (IIa)$$

$$R^2-NH_2 \qquad (IIIa)$$

in which $R^1$ and $R^2$ have the same meaning as in formula (I), with the exception of $H_2N-R-$ and H, with (B) polycarbonates of the general formula (IVa)

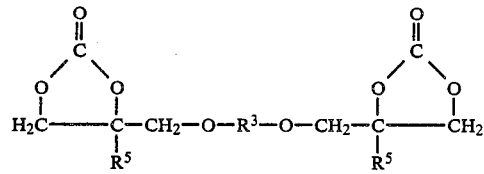

in which $R^3$ and $R^5$ have the same meanings as in formula (I), and, if appropriate (C) reacting the reaction product further with polycarboxylic acids of the formula (Va)

$$H-OR^4 \qquad (Va)$$

in which $R^4$ has the same meaning as in formula (I) with the exception of H, or with anhydrides thereof, to give a product having an acid number between 0 and 100, and, if appropriate (D) neutralizing the reaction product partly or completely by adding a basic compound and, if appropriate, (E) mixing the reaction product vigorously with an amount of water such that an aqueous dispersion having a solids content of up to 75% by weight, relative to the dispersion, is obtained.

8. The process as claimed in claim 7, wherein the reaction of (A) and (B) or stage (C) is carried out at temperatures from 20° to 200° C.

9. The process as claimed in claim 7, wherein the reaction of (A) and (B) or stage (C) is carried out with the addition of inert organic solvents.

10. The process as claimed in claim 7, wherein the reaction product obtained in stage (C) has an acid number of 5–60 and this reaction product is then neutralized partly or completely in stage (D) by adding an organic basic compound, and is vigorously mixed in stage (E) at temperatures between 25° and 100° C. with an amount of water such that a stable, aqueous dispersion having a solids content of 5–65% by weight, relative to the dispersion, is obtained.

11. The process as claimed in claim 9, wherein the inert organic solvent added is N-methylpyrrolidone and/or diglycol dimethyl ether, in an amount of up to 100% by weight, relative to the mixture of reactants.

12. An aqueous paint formulation for deposit by anaphoresis containing a binder component of claim 1.

13. An adhesive composition containing a polymer of claim 1 and optionally at least one member of the group consisting of masked and non-masked isocyanates and polyisocyanates, melamine resins, alkyd resins and epoxy resins.

14. A paint composition containing a polymer of claim 1 and optionally at least one member of the group consisting of masked and non-masked isocyanates and polyisocyanates, melamine resins, alkyd resins and epoxy resins.

* * * * *